United States Patent [19]

Landriault

[11] Patent Number: 4,629,224
[45] Date of Patent: * Dec. 16, 1986

[54] TUBULAR CONNECTION

[75] Inventor: L. Steven Landriault, Houston, Tex.

[73] Assignee: Hydril Company, Los Angeles, Calif.

[*] Notice: The portion of the term of this patent subsequent to Aug. 27, 2002 has been disclaimed.

[21] Appl. No.: 783,055

[22] Filed: Oct. 1, 1985

Related U.S. Application Data

[63] Continuation of Ser. No. 488,778, Apr. 26, 1983, abandoned.

[51] Int. Cl.$^4$ ............................................. F16L 15/04
[52] U.S. Cl. ................................. 285/334; 285/351; 285/390
[58] Field of Search ............... 285/333, 334, 351, 355, 285/390, 332

[56] References Cited

U.S. PATENT DOCUMENTS

| | | | |
|---|---|---|---|
| 1,932,427 | 6/1931 | Stone | 285/334 |
| 2,211,179 | 8/1940 | Stone | 285/334 |
| 2,239,942 | 5/1939 | Stone | 285/334 |
| 3,100,656 | 8/1963 | MacArthur | 285/334 |
| 3,195,927 | 7/1965 | Kimbrell | 285/333 |
| 3,224,799 | 12/1965 | Blose | 285/334 |
| 3,489,437 | 1/1970 | Duret | 285/334 |
| 3,989,284 | 11/1976 | Blose | 285/334 |
| 4,009,893 | 3/1977 | Schatton et al. | 285/334 |
| 4,085,951 | 4/1978 | Morris | 285/355 |
| 4,192,533 | 3/1980 | Blose | 285/355 |
| 4,244,607 | 1/1981 | Blose | 285/334 |
| 4,253,687 | 3/1981 | Maples | 285/355 |
| 4,373,754 | 2/1983 | Bollfrass | 285/355 |
| 4,473,245 | 9/1984 | Raulins et al. | 285/334 |
| 4,537,429 | 8/1985 | Landriault | 285/334 |

FOREIGN PATENT DOCUMENTS

| | | | |
|---|---|---|---|
| 0628915 | 4/1936 | Fed. Rep. of Germany | 285/334 |
| 2116276 | 9/1983 | United Kingdom . | |

OTHER PUBLICATIONS

Kelly, Am. Petroleum Inst., Drilling and Production Practice of 1949-Copy Right 1950 p. 385, Figure #4.
ASME Publication, 75-Pet-34, "An Investigation of Coupled Tubing Joints for Sour Service" pp. 1-12.

Primary Examiner—Cornelius J. Husar
Assistant Examiner—Eric K. Nicholson
Attorney, Agent, or Firm—Dodge, Bush & Moseley

[57] ABSTRACT

A tubular joint or connector of box and pin members is disclosed having two-step tapered threads. Two metal-to-metal seals of complementary engaging sealing surfaces are provided, one adjacent the end of the pin member, the other axially disposed between the two steps. Reverse angle torque shoulders at the end of the pin member and the interior termination of the box member and hooked threads further characterize the joint and box and pin members.

7 Claims, 3 Drawing Figures

TUBULAR CONNECTION

This application is a continuation of application Ser. No. 488,778, filed Apr. 26, 1983 now abandoned.

BACKGROUND OF THE INVENTION

1. Field of the Invention

The invention relates generally to a tubular connection for tubular members used in the oilfield. Specifically, the invention relates to a heavy wall connection for tubular members under conditions of high tension and high pressure which demand that heavy wall casing be used as production casing or tie-back casing in deep severe service oil or gas wells.

2. Description of the Prior Art

Downhole conditions in wells reaching depths over fifteen thousand feet include pressures approaching twenty-five thousand (25,000) psi and temperatures approaching five hundred (500) degrees fahrenheit. Downhole conditions are often characterized as severe when sweet gas $C_O2$ or sour gas $H_2S$ is encountered. In order to withstand deep well and severe service conditions, the production casing is often required to be three times as thick as standard API walls for comparable outside diameter pipe sizes.

Inherent with the increased wall thickness required for deep severe service wells is increased string weight and rigidity of the tubular members. Prior art thick walled connections have had a tendency for thread jump-out and seal galling. These disadvangates of prior art connections for thick walled tubular members are attributable to positive flank thread profiles of the long tubular strings and the rigidity of the thick walled casings.

It is therefore an object of this invention to provide a thick walled tubular connection and pin and box members for that connection which overcome the disadvantages of the prior art connections.

It is a further object of this invention to provide a connection which allows for adjustment to tolerance variations in outside diameter and inside diameter of the pipe body without weakening the connection.

It is a further object of this invention to provide a tubular connection which reduces the susceptibility of the connection to stress corrosion cracking in a severe service environment.

It is still another object of the invention to provide a connection which inhibits excessive compression forces from radially collapsing the end of the pin member.

It is another object of the invention to provide a connection which creates axial compression of the internal surface of the pin thereby reducing the susceptibility of the connection to stress corrosion cracking in a severe service environment.

It is another object of the invention to provide sealing surfaces which increase the seal radial load distribution over that provided by prior art connections thereby reducing the tendency for galling by reducing peak seal load.

It is another object of the invention to provide a connection which combats the tendency for jump-out by locking the pin and box together thereby reducing collapse of the pin and expansion of the box.

SUMMARY OF THE INVENTION

The above mentioned objects and other advantages and features of the invention are provided in a tubular connection of pin and box members having first and second pairs of interengaged threads on the respective members. The first pair of threads is axially spaced from the second pair of threads. The first and second pairs of threads are preferably provided on substantially the same taper angle with respect to the axis of the connection of the tubular members, but under certain conditions the first and second pairs of threads may be provided at different taper angles. The first pair of threads are radially stepped with respect to the second pair of threads.

The connection includes a first pair of conical sealing surfaces on the pin and box members disposed adjacent the end of the pin member. A second pair of engaged conical sealing surfaces is provided on the pin and box members and disposed axially between the first and second pair of threads. Engaged reversed angle torque shoulders are provided where the torque shoulder on the pin member is disposed on the end of the pin member and the torque shoulder on the box member is disposed on the interior end of the box member. Preferably the threads of the two pairs of interengaged threads are hooked threads having negative angle load flanks.

According to the invention, the hooked threads develop hoop compression when the joint is subject to tension thereby locking the pin and box together and reducing collapse of the pin and expansion of the box. When the joint is subjected to bending, the hooked threads develop hoop compression on the side of the joint in tension as a result of the bending, while the engaged reverse angle torque shoulders absorb the bending load on the other side of the joint put in compression as a result of the bending.

The engaged reverse angle torque shoulders are adapted to create a substantially recess free bore in the tubular line in order to enhance fluid flow through the pipe, to serve as a positive stop and locking device for assembly torque, to inhibit excessive hoop compression forces from collapsing the end of the pin, to fix the axial relation of the end of the pin to the box, to create axial compression over the internal surface to reduce the susceptibility of the joint to stress corrosion cracking in a severe service environment and to cause the pair of engaged conical surfaces disposed adjacent the end of the pin to expand radially.

The first and second pairs of conical sealing surfaces are preferably provided at steeper angles than the taper angle. Although the precise angles of the sealing surfaces and taper angles are dependent on the wall of the connection, the first and second pair of conical sealing surfaces are preferably provided at an angle of approximately four to fourteen degrees with respect to the axis of the joint while the taper angle of the first and second pair of threads is preferably approximately two to eight degrees with respect to the axis of the joint.

BRIEF DESCRIPTION OF THE DRAWINGS

The foregoing summary of the invention and other objects and advantages of the invention will be described in more detail below taken in conjunction with the accompanying drawings of which.

DESCRIPTION OF THE INVENTION

Figure 1:
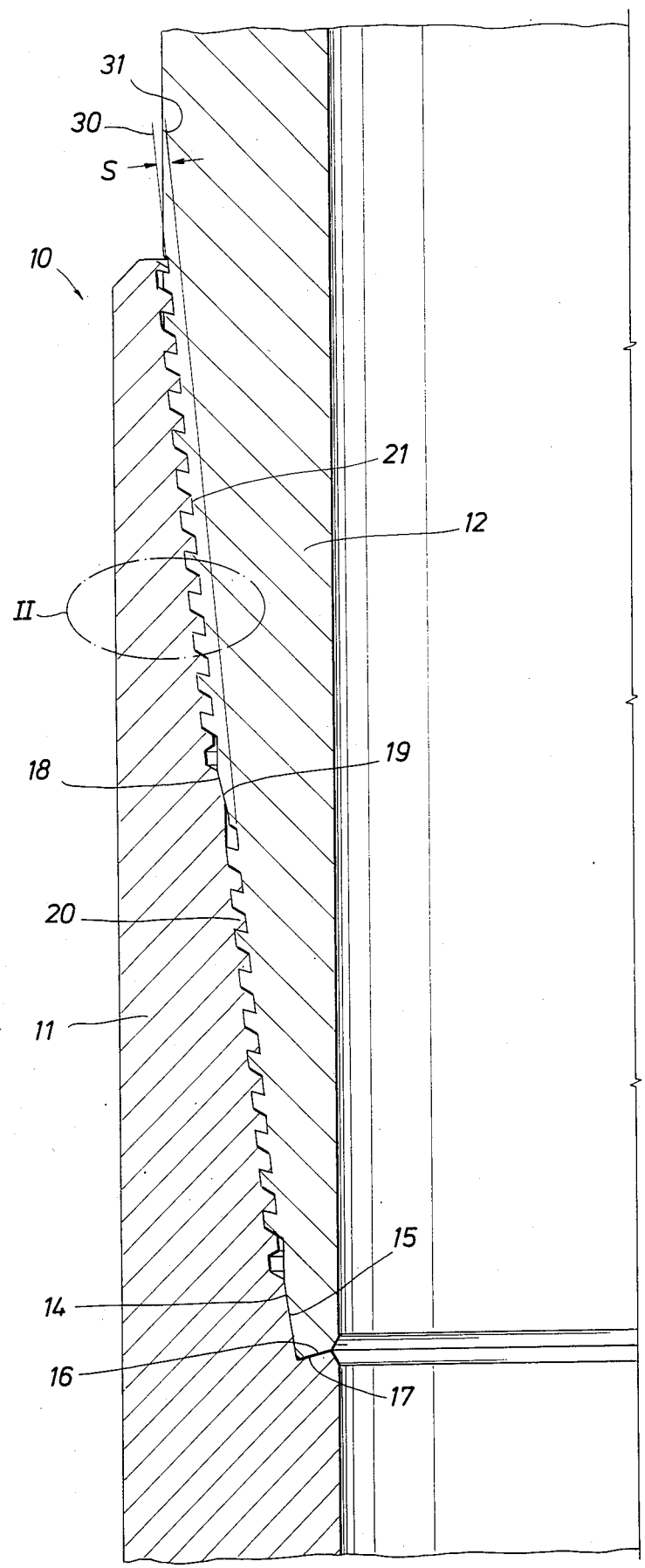
FIG. 1 is a cross-section through the tubular connection showing pin and box members interengaged.

FIG. 1 illustrates the tubular connection 10 according to the invention in which a pin member 12 is threadedly interengaged with a box member 11. The pin member 12 and box member 11 have first and second threaded surfaces 21 and 20 which are preferably provided on identical taper angles with respect to the axis of the joint. Under certain conditions, the taper angles of the first and second threaded surfaces may be provided on unequal taper angles. Extension lines 30 and 31 are shown extending along the roots respectively of the threaded surfaces 21 and 20 of pin member 12. The taper angles measured with respect to the axis of lines 30 and 31 are substantially identical in that lines 30 and 31 are parallel but offset by a distance S perpendicular to the two taper extension lines 30 and 31. The magnitude of distances S depends on the wall thickness of the tubular member and the length of sealing surfaces 18 and 19.

Metal-to-metal frustro-conical sealing surfaces 18 and 19 are provided axially between first and second threaded surfaces 21 and 20. Metal-to-metal sealing surfaces 14 and 15 are provided adjacent the end of the pin and the interior end of the box. Complementary reverse angle torque shoulders 16 and 17 are provided on the end of the pin 12 and on the interior end of the box 11.

Figure 2:
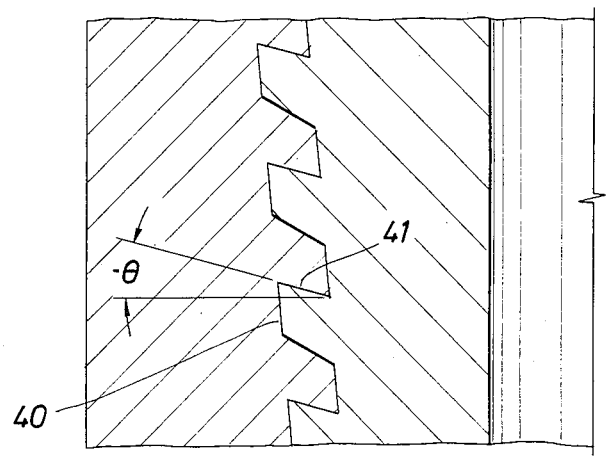
FIG. 2 is an enlarged illustration of a threaded portion of the connection illustrating hooked threads.

According to the invention, the threaded surfaces are provided in the form of hooked threads. An example thread is illustrated in FIG. 2 by reference number 40 showing that the load flank 41 is provided at a negative angle ($-\theta$) with respect to a radial plane through the thread.

According to the invention, the threaded connection including the two-step profile, facilitates deep stabbing and ease of make-up between the pin member 12 and the box member 11. Providing the taper angles as illustrated by taper lines 30 and 31 enables the connection to have maximum thread and critical section areas allowing uniform reduction in section flexibility around the sealing regions, and reduction of the relative step height S between the stepped thread regions. The taper of the threads also allows for adjustment to tolerance variations in pipe outside diameter and inside diameter provided by tubular fabricators without weakening the connection.

The torque shoulders 16 and 17 are completely internal to the connection and create an essentially recess free bore to enhance fluid flow. The torque shoulders serve as a positive stop and locking means as the pin and box members are assembled under torquing conditions. The reverse angle of the torque shoulders serves to inhibit excessive hoop compressive forces from collapsing the end of the pin 12. The reverse shoulder angle also fixes the relation between the end of the pin and the interior end of the box. The internal torque shoulder also creates axial compression along an axial region of the internal surface of the pin thereby reducing the susceptibility of the connection to stress corrosion cracking in a severe service environment. The compressive force resulting from the reverse angle torque shoulder also tends to cause the seal region defined by sealing surfaces 14 and 15 to expand radially due to the end load.

The metal-to-metal seals defined by sealing surfaces 14 and 15 and 18 and 19 are provided respectively as an internal seal and as a backup seal for internal pressure and a primary external seal. Due to the increased rigidity of the thick tubular walls, the threaded surfaces are provided on tapers thereby allowing the sealing angles to be more shallow than typical cylindrical two-step metal-to-metal seals. The shallowness of the angles of the sealing surfaces increases the sealing surface contact area thereby increasing the seal radial load distribution and reducing the tendency for galling by reducing the peak sealing load. The sealing angles are provided in a range of four to fourteen degrees with respect to the axis of the joint, the particular angle of any connection depending on the wall thickness of the connection.

The hooked threads provided in the tubular connection 10 inhibit the tendency for thread jump-out. The negative angle load flank threads, when subjected to tension between the pin 12 and the box 11, develop a hoop compression component. The hoop compression locks the pin and box together thereby reducing collapse of the pin and expansion of the box. A similar reaction occurs when the tubular connection is subjected to bending wherein on the tension side of the connection, the hooked threads develop a hoop compression component locking that side of the pin and box together, while the torque shoulder absorbs the load on the compression side of the bending connection.

Figure 3:
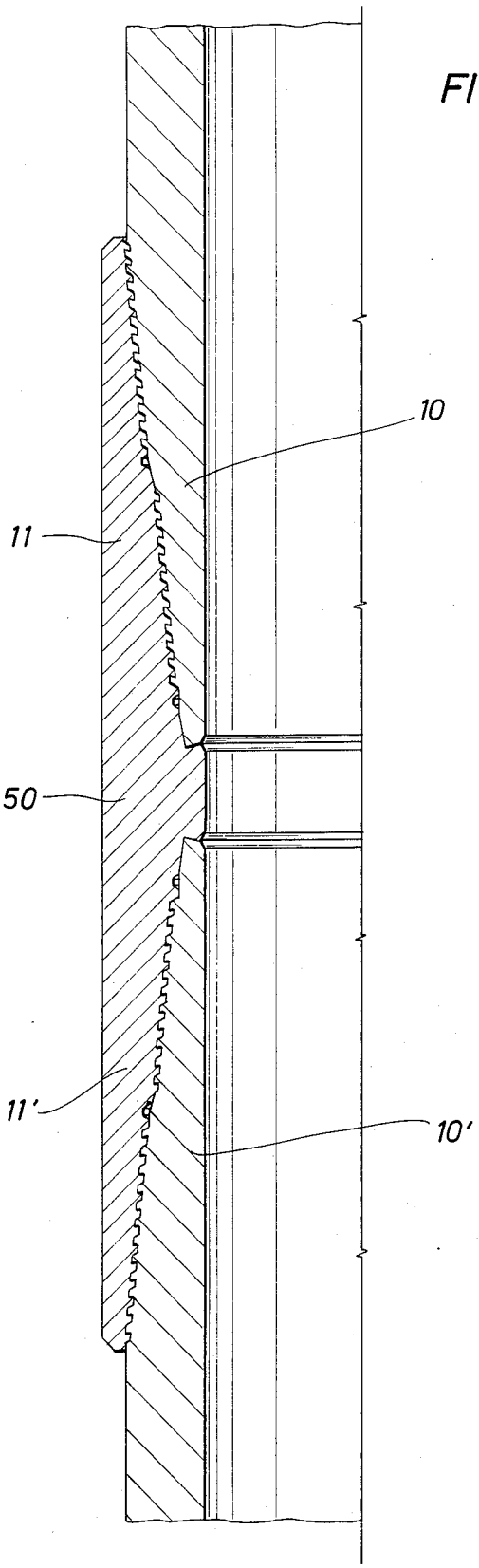
FIG. 3 is an illustration of the pin member of two tubular members.

FIG. 3 illustrates a connector serving to connect the ends of two tubular members. Two box threaded surfaces 11 and 11' serve to interengage with pin threaded surfaces 10 and 11' of the two tubular members. The connection between box and pin 10' is the mirror image of that between box 11 and pin 10.

Various modifications and alterations in the described tubular connection will be apparent to those skilled in the art from the foregoing description which does not depart from the spirit of the invention. The foregoing disclosure and description of the invention are illustrative and explanatory thereof and details of the illustrative embodiment may be made without departing from the spirit of the invention.

What is claimed is:

1. A tubular connection of pin and box members defining an axis comprising, first and second pairs of interengaged threads on the respective members, the first pair of threads being axially spaced from the second pair of threads, the first and second pairs of theads provided on first and second taper angles with respect to the axis, the first pair of threads being radially stepped with respect to the second pair of threads, a first pair of engaged sealing surfaces on the pin and box members disposed adjacent the end of the pin member, a second pair of engaged sealing surfaces on the pin and box members disposed axially between the first and second pairs of threads, the first and second pairs of sealing surfaces being frusto-conical surfaces provided at steeper angles than either the first taper angle or the second taper angle, engaged reverse angle torque shoulders, the torque shoulder on the pin member disposed on the end of the pin member, the torque shoulder on the box member disposed on the interior end of the box member, and wherein said threads are hooked threads having negative angle load flanks.

2. A pin member for a tubular member and adapted for coaxial connection to a box member, the pin member comprising, first and second axially spaced threads provided on first and second taper angles with respect to the axis of the pin, the first thread being radially stepped with respect to the second thread, a first sealing surface on the pin member disposed adjacent the end of the pin member, a second sealing surface on the pin member disposed axially between the first and second threads, the first and second taper angles are substantially identical and the first and second sealing surfaces are frusto-conical surfaces provided at steeper angles than the taper angle, a reverse angle torque shoulder disposed on the end of the pin member, and wherein the first and second threads are hooked threads having negative angle load flanks.

3. The pin member of claim 2 wherein the first and second fursto-conical sealing surfaces are provided from a range of angles of approximately four to fourteen degrees with respect to the axis of the pin.

4. The pin member of claim 2 wherein the first and second threads are provided on a taper angle from a range of angles of approximately two to eight degrees with respect to the axis of the pin.

5. A box member adapted for coaxial connection to a pin member disposed on the end of a tubular member, the box member comprising, first and second axially spaced threads provided on first and second taper angles with respect to the axis of the box, the first thread being radially stepped with respect to the second thread, a first sealing surface about the interior of the box member disposed adjacent the interior end of the box member, a second sealing surface about the interior of the box member disposed axially between the first and second threads, the first and second sealing surfaces being fursto-conical surfaces provided at steeper angles than the taper angle, a reverse angle torque shoulder disposed on the interior end of the box member, and wherein the first and second threads are hooked threads having negative angle load flanks.

6. The box member of claim 5 wherein the first and second sealing surfaces are frusto-conical surfaces provided from a range of angles of approximately four to fourteen degrees with respect to the axis of the box.

7. The box member of claim 5 wherein the first and second threads are provided on a taper angle from a range of angles of approximately two to eight degrees with respect to the axis of the box.

* * * * *